United States Patent
Lange (10) Patent No.: US 10,375,696 B2
(45) Date of Patent: *Aug. 6, 2019

(54) OPTIMIZING POWER ALLOCATION IN SIGNAL DISTRIBUTION SYSTEMS USING VARIABLE AND STATIC GAINS

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/958,897

(22) Filed: Apr. 20, 2018

(65) Prior Publication Data
US 2019/0110296 A1    Apr. 11, 2019

Related U.S. Application Data

(63) Continuation of application No. 14/441,389, filed as application No. PCT/US2015/012267 on Jan. 21, 2015, now Pat. No. 9,980,269.

(Continued)

(51) Int. Cl.
*H04W 72/04* (2009.01)
*H04B 17/13* (2015.01)
(Continued)

(52) U.S. Cl.
CPC ........ *H04W 72/0473* (2013.01); *H04B 7/026* (2013.01); *H04B 17/13* (2015.01);
(Continued)

(58) Field of Classification Search
None
See application file for complete search history.

(56) References Cited

U.S. PATENT DOCUMENTS 5,668,562 A    9/1997   Cutrer et al.
6,373,823 B1   4/2002   Chen et al.
(Continued)

FOREIGN PATENT DOCUMENTS

WO    2013079913 A1   6/2013
WO    2015116451 A1   8/2015

OTHER PUBLICATIONS

International Bureau; "Notification Concerning Transmittal of International Preliminary Report on Patentability from PCT Application No. PCT/US2015/012267 dated Aug. 11, 2016"; From Foreign Counterpart of U.S. Appl. No. 14/441,389, filed Aug. 11, 2016; pp. 1-6, Published: Switzerland.

(Continued)

*Primary Examiner* — Fayyaz Alam
(74) *Attorney, Agent, or Firm* — Fogg & Powers LLC (57) ABSTRACT

Systems and methods are provided for optimizing power allocation in distributed antenna systems and other signal distribution systems using variable and static gains. A power optimization sub-system can receive downlink signals from one or more base stations. The power optimization sub-system can group the downlink signals into a first set of downlink signals for which a static gain is to be applied and a second set of downlink signals for which a variable gain is to be applied. The power optimization sub-system can determine a gain for at least some of the signals to which a variable gain is to be applied. The determined gain can be sufficient to achieve a target metric. The power optimization sub-system can apply the static gain to the first set of signals and apply the determined gain to the second set of signals.

20 Claims, 5 Drawing Sheets

Related U.S. Application Data (60) Provisional application No. 61/933,747, filed on Jan. 30, 2014.

(51) Int. Cl.
*H04W 52/24* (2009.01)
*H04W 52/46* (2009.01)
*H04B 7/026* (2017.01)
*H04W 88/08* (2009.01)

(52) U.S. Cl.
CPC ....... *H04W 52/241* (2013.01); *H04W 52/245* (2013.01); *H04W 52/46* (2013.01); *H04W 88/085* (2013.01)

(56) References Cited

U.S. PATENT DOCUMENTS

| | | |
|---|---|---|
| 7,308,042 B2 | 12/2007 | Jin et al. |
| 8,175,649 B2 | 5/2012 | Saban et al. |
| 8,472,409 B2 | 6/2013 | Sun et al. |
| 8,532,580 B2 | 9/2013 | Elliott et al. |
| 8,611,916 B2 | 12/2013 | Gao |
| 8,682,338 B2 | 3/2014 | Lemson et al. |
| 9,980,269 B2 | 5/2018 | Lange |
| 2005/0068219 A1* | 3/2005 | Kobayashi .............. H03M 1/06 341/161 |
| 2008/0175175 A1* | 7/2008 | Oren .................... H04B 1/0064 370/279 |
| 2009/0005096 A1 | 1/2009 | Scheinert |
| 2011/0244914 A1 | 10/2011 | Venkatraman et al. |
| 2011/0269404 A1 | 11/2011 | Hu et al. |
| 2011/0319124 A1 | 12/2011 | Chan et al. |
| 2012/0100814 A1* | 4/2012 | Soulhi .................. H04B 7/0491 455/67.14 |
| 2012/0142269 A1* | 6/2012 | Wilhite .............. H04B 7/15535 455/7 |
| 2012/0308238 A1 | 12/2012 | Shida |
| 2013/0040676 A1 | 2/2013 | Kang et al. |
| 2013/0095871 A1 | 4/2013 | Soriaga et al. |
| 2013/0095875 A1 | 4/2013 | Reuven |
| 2013/0260706 A1 | 10/2013 | Singh |
| 2013/0308537 A1 | 11/2013 | Kummetz et al. |
| 2013/0329650 A1 | 12/2013 | Cui et al. |
| 2014/0010548 A1 | 1/2014 | Berlin et al. |
| 2014/0050483 A1 | 2/2014 | Berlin et al. |
| 2014/0066115 A1 | 3/2014 | Sanders |
| 2014/0079037 A1 | 3/2014 | Evans et al. |
| 2014/0087742 A1 | 3/2014 | Brower et al. |

OTHER PUBLICATIONS

International Searching Authority; "Notification of Transmittal of the International Search Report and the Written Opinion of the International Searching Authority from PCT Application No. PCT/US2015/012267 dated Mar. 24, 2015"; From Foreign Counterpart of U.S. Appl. No. 14/441,389, filed Mar. 24, 2015, pp. 1-9, Published: WO.

U.S. Patent and Trademark Office, "Final Office Action", U.S. Appl. No. 14/441,389, dated May 9, 2017, pp. 1-29, Published: US.

U.S. Patent and Trademark Office, "Final Office Action", U.S. Appl. No. 14/441,389, dated Aug. 25, 2016, pp. 1-32, Published: US.

U.S. Patent and Trademark Office, "Notice of Allowance", U.S. Appl. No. 14/441,389, dated Jan. 23, 2018, pp. 1-14, Published: US.

U.S. Patent and Trademark Office, "Office Action", U.S. Appl. No. 14/441,389, dated Apr. 27, 2016, pp. 1-35, Published: US.

U.S. Patent and Trademark Office, "Office Action", U.S. Appl. No. 14/441,389, dated Dec. 23, 2016, pp. 1-27, Published: US.

* cited by examiner

OPTIMIZING POWER ALLOCATION IN SIGNAL DISTRIBUTION SYSTEMS USING VARIABLE AND STATIC GAINS

CROSS-REFERENCE TO RELATED APPLICATION

This is a continuation of U.S. Non-Provisional application Ser. No. 14/441,389, titled "OPTIMIZING POWER ALLOCATION IN SIGNAL DISTRIBUTION SYSTEMS USING VARIABLE AND STATIC GAINS" and filed May 5, 2015, which is a U.S. national phase under 35 U.S.C. 371 of International Patent Application No. PCT/US2015/012267, titled "Optimizing Power Allocation In Signal Distribution Systems Using Variable And Static Gains" and filed Jan. 21, 2015, which claims the benefit of U.S. Provisional Application Ser. No. 61/933,747, filed Jan. 30, 2014 and titled "Methods and Systems for Multiple Operator Power Optimization for a Multiband Radio System," the contents of which are incorporated herein by reference.

TECHNICAL FIELD

The present disclosure relates generally to telecommunication systems and more particularly (although not necessarily exclusively) to optimizing power allocation in distributed antenna systems and other signal distribution systems using variable and static gains.

BACKGROUND

RF distribution systems can be used to distribute and transmit radio signals in telecommunication systems. For example, a distributed antenna system ("DAS") can include one or more master units or other head-end units and multiple remote units coupled to each master unit. A DAS can be used to extend wireless coverage in an area. Master units can be communicatively coupled to base stations. A master unit can receive downlink signals from the base station and distribute downlink signals in an analog or digital format to a radio frequency distribution system, which can include one or more remote units. The remote units can transmit the downlink signals to user equipment within coverage areas serviced by the remote units.

A DAS or other RF distribution system may be configured to use a budgeted amount of RF power. The budgeted amount of RF power may be determined by regulations governing telecommunications, hardware constraints, or other circumstances. It is therefore desirable to improve the efficiency with which power is allocated for communicating signals via distributed antenna systems and other RF distribution systems.

SUMMARY

According to one aspect, a method is provided. The method can involve a unit of a distributed antenna system receiving downlink signals from one or more base stations. The method can also involve the unit grouping the downlink signals into a first set of downlink signals for which a static gain is to be applied and a second set of downlink signals for which a variable gain is to be applied. The method can also involve applying the static gain to the first set of downlink signals. The method can also involve determining a gain for at least some signals from the second set of downlink signals. The gain can be sufficient to achieve a specified metric indicative of a performance level of the DAS. The method can also involve applying the determined gain to the second set of downlink signals.

According to another aspect, a power optimization sub-system for a DAS is provided. The power optimization sub-system can include a receiving module, a grouping module, and a variable gain module. The receiving module can receive downlink signals from one or more base stations. The grouping module can group the downlink signals into a first set of downlink signals for which a static gain is to be applied and a second set of downlink signals for which a variable gain is to be applied. The variable gain module can determine a gain for at least some of the signals to which a variable gain is to be applied. The determined gain can be sufficient to achieve a specified metric indicative of a performance level of the DAS. The grouping module can provide the set of downlink signals to which a static gain is to be applied to a signal path that is unaffected by the variable gain module.

According to another aspect, a DAS is provided. The DAS can include a unit that can be communicatively coupled to one or more base stations. The DAS can also include one or more remote units that can be communicatively coupled to the unit. The unit can receive downlink signals from one or more base stations and group the downlink signals into a first set of downlink signals for which a static gain is to be applied and a second set of downlink signals for which a variable gain is to be applied. The unit can also determine a gain for at least some signals to which a variable gain is to be applied. The determined gain can be sufficient to achieve a specified metric indicative of a performance level of the DAS. The unit can transmit data identifying the determined gain to the remote unit. The remote unit can apply the static gain to the first set of downlink signals and can apply the determined gain to the second set of downlink signals.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Certain aspects and features relate to applying variable gains and static gains to different sets of signals to optimize power allocation in a distributed antenna system ("DAS") or other signal distribution system. For example, a power optimization sub-system of a DAS can identify a first subset of signals to which a variable gain is to be applied and a second subset of signals to which a static gain is to be applied. A unit of the DAS can determine a gain to be applied to the first subset of signals and route the first subset of signals to a variable gain adjustment device that applies the determined gain. The unit of the DAS can route the second subset of signals to an alternative signal path. The alternative signal path may not include the variable gain adjustment device or may be otherwise unaffected by a variable gain module used to determine or apply a variable gain. A remote unit of the DAS that receives both subsets of signals can include a power amplifier that applies the static gain to at least the second subset of signals.

Routing some received signals to a variable gain adjustment device and other signals to a signal path without the variable gain adjustment device can improve the efficiency with which power is allocated in a DAS or other RF distribution systems. For example, applying a variable gain to downlink signals may improve the ability of terminal devices to improve link budgets. Additionally or alternatively, applying a variable gain to downlink signals may increase the number or terminal devices that may be serviced by one or more remote units or other radiating units in a cell or other coverage zone. Additionally or alternatively, applying a variable gain to downlink signals may improve overall throughput of data communication through the DAS or other RF distribution system.

However, applying a variable gain may not be optimal in all cases. For example, using variable gain may also create problems if a first remote unit or other radiating unit in a first cell or other coverage zone is handing service of a terminal device over to a second remote unit or other radiating unit in a second cell or other coverage zone. A static gain can be applied to signals for cases in which applying variable gain may not be optimal, applied in certain circumstances. In one example, a static gain can be applied to signals that are provided to remote units or other radiating units that provide service at or near a boundary between a first cell or other coverage zone and a second remote unit or other radiating unit in a second cell or other coverage zone. In another example, a static gain can be applied to signals that are provided to remote units that provide service for terminal devices in communication with a Global System for Mobile Communications ("GSM") telecommunication provider. In this example, the gain of signals is not modified during time-division multiplexing slots, and changes in gain can be synchronized to the timing of these slots. The optimization sub-system can utilize the advantages of both variable gain and static gain by determining whether applying a variable gain or a static gain to a given signal or set of signals would provide more effective coverage in the DAS.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
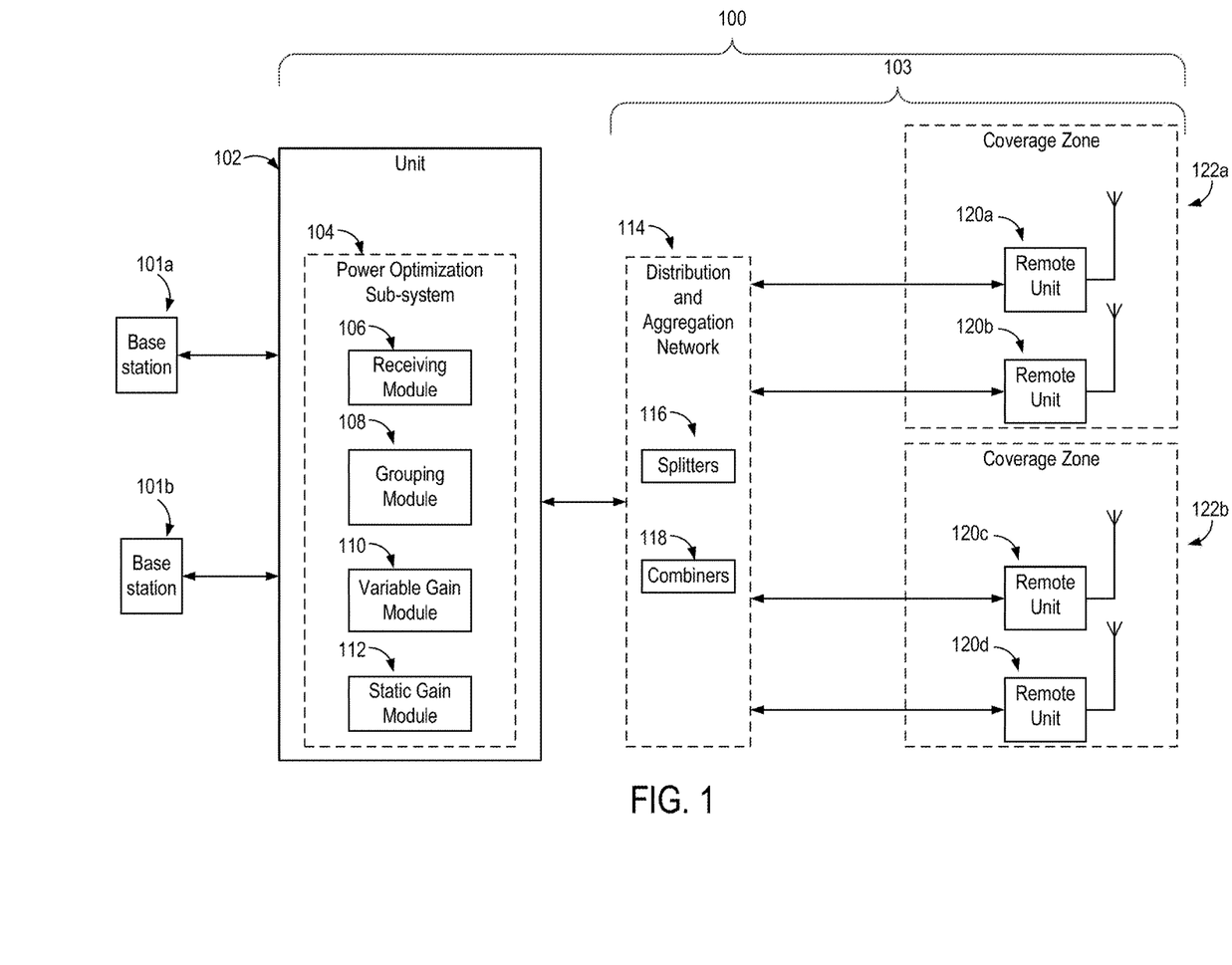
FIG. 1 is a block diagram depicting an example of a distributed antenna system ("DAS") that can include a power optimization sub-system according to one aspect of the present disclosure.

FIG. 1 is a block diagram depicting an example of a DAS 100 that can include a power optimization sub-system 104 according to one aspect.

The DAS 100 can include one or more units 102 and a signal distribution system 103. The unit 102 can include a power optimization sub-system 104. The power optimization sub-system 104 can include a receiving module 106, a grouping module 108, a variable gain module 110, and a static gain module 112. The signal distribution system 103 can include a distribution and aggregation network 114 and remote units 120a-d servicing coverage zones 122a, 122b. For illustrative purposes, FIG. 1 depicts two base stations, a single unit, and four remote units. However, any number of base stations, units, and remote units can be used.

The unit 102 can be communicatively coupled to one or more base stations 101a, 101b or other suitable device that provides wireless service within a geographic area or structure. Any suitable communication link can be used for communicatively coupling the base stations 101a, 101b and the unit 102. In some aspects, the communication link can be a wired connection. Non-limiting examples of a wired connection include a copper cable, an optical fiber, or other suitable wired communication medium. In additional or alternative aspects, the communication link can be a wireless connection.

In some aspects, different base stations 101a, 101b may utilize different telecommunication technologies. For example, one or more of the base stations 101a, 101b can be part of a Long-Term Evolution ("LTE") telecommunications system, a Global System for Mobile Communications ("GSM") telecommunications system, a Universal Mobile Telecommunications System ("UMTS") telecommunications system, or some combination of these or other types of telecommunications systems. In some aspects, multiple base stations having different numbers of antenna ports can transmit downlink signal to the unit 102.

The power optimization sub-system 104 can be used to optimize power allocation in the DAS 100. The receiving module 106 can receive downlink signals, such as (but not limited to) RF signals, from one or more antenna ports of one or more of the base stations 101a, 101b that are communicatively coupled to the unit 102.

The grouping module 108 may group, separate, identify, or otherwise route a first set of the received signals to which a static gain is to be applied and a second set of the received signals to which a variable gain is to be applied. In some aspects, the grouping module 108 can utilize one or more static rules or static configurations for grouping sets of received signals. In additional or alternative aspects, the grouping module 108 can utilize one or more modifiable rules or modifiable configurations for grouping sets of received signals. These rules or configurations can be modified automatically by the power optimization sub-system 104, can be modified manually by an operator of the DAS 100, or can be modified by some combination of automatic and manual operations.

The variable gain module 110 can dynamically determine a gain to be applied to the second set of signals to which a variable gain is to be applied. In some aspects, the variable gain can be identified, selected, or otherwise determined such that a desired power level is obtained for transmitting signals using the DAS 100.

In additional or alternative aspects, the variable gain can be identified, selected, or otherwise determined such that another target metric for the DAS 100 is achieved. A target metric can be a specified metric indicative of a performance level of the DAS 100. One example of a target metric is a service priority. For example, one or more services from a first telecommunication provider may be prioritized over one or more services from a second telecommunication provider, a first service from a telecommunication provider may be prioritized over a second service from the same telecommunication provider, or some combination thereof can be used to prioritize services provided by one or more telecommunication providers via the DAS 100. Another example of a target metric is a reduction of intermodulation products. For example, the gains of signals transmitted via the DAS 100 can be modified to minimize or otherwise reduce the power of intermodulation products generated by these signals. Another example of a target metric is a balancing of budgeted uplink power and budgeted downlink power.

The variable gain module 110 applies the dynamically determined gain to the second set of signals. In some aspects, the variable gain module 110 can include one or more devices in the unit 102 that both determine the gain to be applied to the second set of signals and apply the determined gain to the second set of signals. In additional or alternative aspects, the variable gain module 110 can include one or more devices in the unit 102 that determine the gain to be applied to the second set of signals and one or more devices in one or more remote units 120a-d that apply the determined gain to the second set of signals.

The static gain module 112 can apply a predetermined gain to the first set of the signals to which a static gain is to be applied. In some aspects, the static gain module 112 can include one or more power amplifiers in the remote units 120a-d. In additional or alternative aspects, the static gain module 112 can include one or more amplifiers in the unit 102.

For illustrative purposes, FIG. 1 depicts the receiving module 106, the grouping module 108, the variable gain module 110, and the static gain module 112 as being included in the unit 102. Other implementations, however, are possible. For example, in some aspects, one or more of the receiving module 106, the grouping module 108, the variable gain module 110, and the static gain module 112 can be included in one or more of the remote units 120a-d. In additional or alternative aspects, some components of one or more of the receiving module 106, the grouping module 108, the variable gain module 110, and the static gain module 112 can be included in the unit 102 and other components of one or more of the receiving module 106, the grouping module 108, the variable gain module 110, and the static gain module 112 can be included in one or more of the remote units 120a-d.

The distribution and aggregation network 114 can include communication links that communicatively couple the unit 102 to the remote units 120a-d (e.g., optical fiber, coaxial cable, etc.). For example, the remote units 120a-d or other suitable antenna nodes can be communicatively coupled to the unit 102 via one or more transport media. In some aspects, the distribution and aggregation network 114 can also include devices such as extension units that may include one or more splitter units 116 and one or more combiner units 118.

Portions of the distribution and aggregation network 114 may be communicatively coupled to ports of different remote units 120a-d. For example, in some aspects, each of the coverage zones 122a, 122b can be associated with a respective extension network within the distribution and aggregation network 114. A given extension network can split downlink signals and distribute the downlink signals to remote units or other radiating units that are communicatively coupled to the extension network.

In some aspects, the distribution and aggregation network 114 can be an active network. In additional or alternative aspects, the distribution and aggregation network 114 can be a passive network. In some aspects, the distribution and aggregation network 114 can be used to transmit analog signals. In additional or alternative aspects, the distribution and aggregation network 114 can be used to transmit digital signals. In some aspects, the distribution and aggregation network 114 can be used to transmit RF signals. In additional or alternative aspects, the distribution and aggregation network 114 can be used to transmit signals that have been down-converted to an intermediate frequency ("IF") or to a baseband (zero IF) frequency.

The DAS 100 can communicate signals between one or more base stations 101a, 101b and terminal devices (e.g., mobile communication devices or other user equipment). For example, the unit 102 can receive downlink signals from the base stations 101a, 101b and transmit uplink signals to the base stations 101a, 101b. The unit 102 can provide downlink signals to the remote units 120a-d via the distribution and aggregation network 114. In some aspects, one or more splitter units 116 in the distribution and aggregation network 114 can be used to split or otherwise separate downlink signals for transmission to multiple remote antenna units. For example, an expansion unit in the distribution and aggregation network 114 can include a splitter unit 116 for splitting downlink signals that are to be provided to multiple remote units 120a, 120b in a coverage zone 122a or to multiple remote units 120c, 120d in a coverage zone 122b.

The units 102 can also receive uplink signals from the remote units 120a-d. In some aspects, one or more combiner units 118 in the distribution and aggregation network 114 can be used to combine uplink signals for transmission to the unit 102. For example, an expansion unit in the distribution and aggregation network 114 can include a combiner unit 118 for combining multiple uplink signals received by multiple remote units 120a, 120b from the same terminal device located in a coverage zone 122a. The expansion unit can transmit the combined uplink signal to the unit 102.

The remote units 120a-d can provide signal coverage in one or more coverage zones 122a, 122b. The remote units 120a-d can include transceiving devices that can include or be communicatively coupled to one or more antennas. Providing signal coverage in the coverage zones can include wirelessly transmitting downlink signals received from the unit 102 to terminal devices in the coverage zones. Providing signal coverage in the coverage zones can also include wirelessly receiving uplink signals from the mobile communication devices or other terminal devices in the coverage zones. The remote units 120a-d can transmit the uplink signals to the unit 102.

For illustrative purposes, FIG. 1 depicts two coverage zones having equal numbers of remote units. Other implementation, however are possible. For example, a given coverage zone can be serviced by any number of remote units. Different coverage zones can be serviced by different numbers of remote units.

Figure 2:
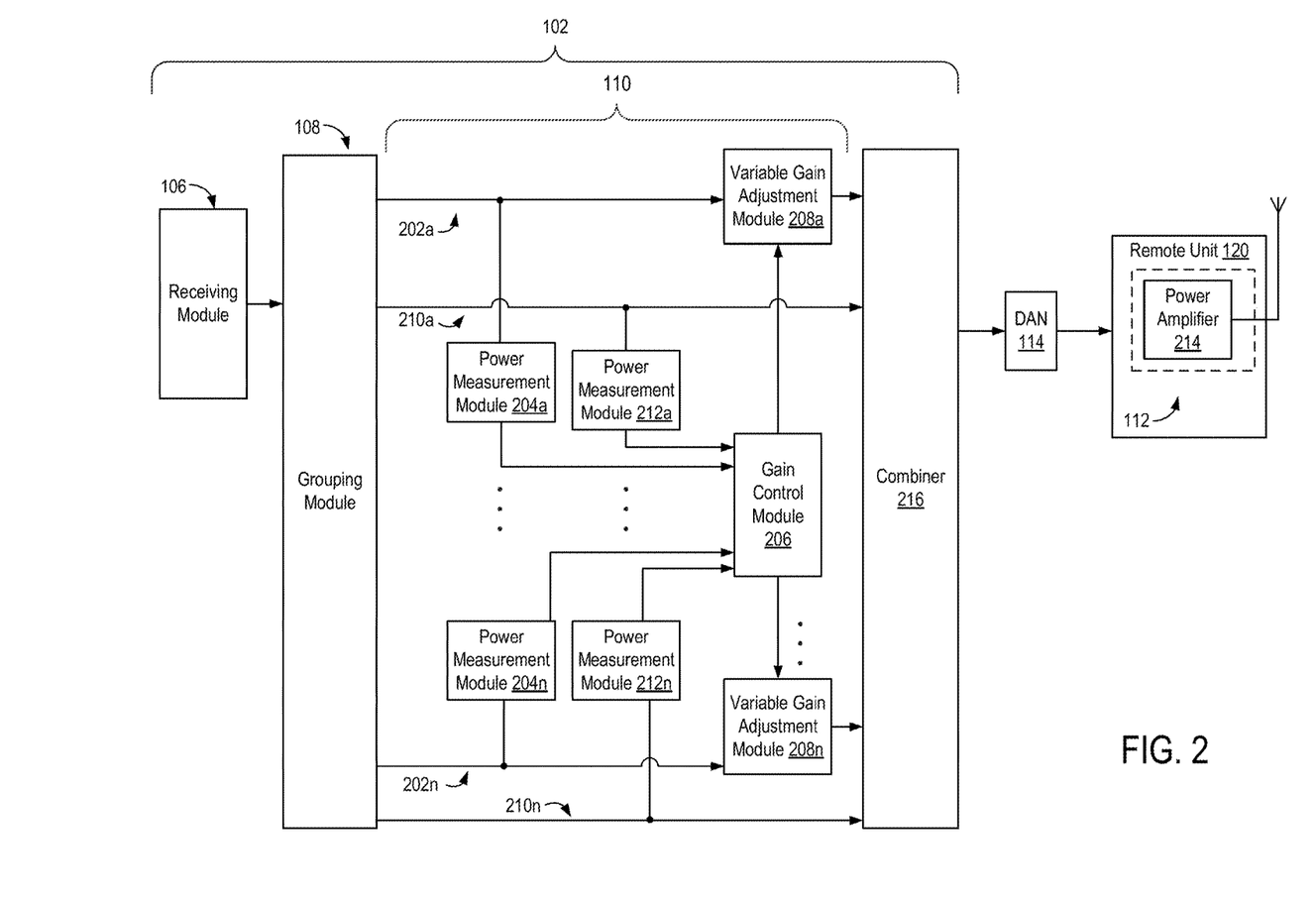
FIG. 2 is a block diagram depicting an example of the power optimization sub-system of FIG. 1 according to one aspect of the present disclosure.

FIG. 2 is a block diagram depicting an example of the power optimization sub-system 104 according to one aspect. As depicted in FIG. 2, the grouping module 108 outputs sets of signals, such as downlink signals received from one or more base stations, to a first set of signal paths 202a-n and a second set of signal paths 210a-n. A first set of signals selected by the grouping module 108 and provided to the first set of signal paths 202a-n can be signals to which a variable gain is to be applied using the variable gain module 110. A second set of signals selected by the grouping module 108 and provided to the second set of signal paths 210a-n can be signals to which a static gain is to be applied without using the variable gain module 110. Any number of signal paths 202a-n (including one) and any number of signal paths 210a-n (including one) can be included in the unit 102.

For illustrative purposes, FIG. 2 depicts a unit 102 performing power optimization for signals being provided to a single remote unit 120. However, any number of remote units may be used. A unit 102 can include multiple combiners 216 for combining multiple sets of downlink signals that are to be provided to respective remote units. In some aspects, the power optimization described herein can be performed on a per-remote unit basis. In additional or alternative aspects, the power optimization described herein can be performed to optimize power usage among multiple remote units that are communicatively coupled to one or more units 102.

The variable gain module 110 depicted in FIG. 2 includes power measurement modules 204a-n, 212a-n, a gain control module 206, and variable gain adjustment modules 208a-n. In some aspects, one or more of the power measurement modules 204a-n, the gain control module 206, and the variable gain adjustment modules 208a-n can be implemented using hardware devices. For example, one or more power measurement modules 204a-n can include a power meter. One or more of the variable gain adjustment modules 208a-n can include a variable gain amplifier or other device having a configurable gain value. In additional or alternative aspects, one or more of the power measurement modules 204a-n, the gain control module 206, and the variable gain adjustment modules 208a-n can be implemented using computer-executable program instructions executed by a processing device.

One or more of the power measurement modules 204a-n can measure a respective power level for signals to which a variable gain is to be applied. One or more of the power measurement modules 212a-n can measure a power level for signals to which a static gain is to be applied.

The power measurements from the power measurement modules 204a-n, 214a-n can be used for identifying an amount of power that can be applied by the power optimization sub-system 104 to signals being communicated via the DAS 100. For example, at a first point in time, each telecommunication provider or service provided via the DAS 100 can have a nominal power assigned (e.g., during a setup of the DAS 100). A nominal output power for a remote unit of the DAS 100 can be the sum of the nominal powers assigned for the services provided via the DAS 100. At a second point in time, the DAS 100 may not utilize the full power assignment for one or more services. In one example, the DAS 100 may not utilize the full power assignment for one or more services if a low load condition is present (e.g., if the number of terminal devices serviced in one or more coverage zones of the DAS 100 is below a threshold number). In another example, the DAS 100 may not utilize the full power assignment for one or more services if terminal devices are positioned near one or more of the base stations 101a, 101b such that the DAS 100 does not need to be used to provide service to those terminal devices. The power measurement modules 204a-n, 214a-n can be used by the power optimization sub-system 104 to determine that less than all of the assigned power for one or more services is being used. If less than all of the assigned power for one or more services is being used, the power optimization sub-system 104 can allocate the power that would otherwise be used for these services to signals in one or more of the variable gain signal paths 202a-n.

Although FIG. 2 depicts multiple power measurement modules 204a-n, 210a-n, other implementations are possible. In some aspects, one or more power measurement modules can be implemented as a power measurement device that can receive inputs from multiple signal paths or a power measurement engine executed by a processor that can receive inputs associated with multiple signal paths. For example, a power measurement module can receive inputs from or inputs associated with multiple signals paths 202a-n, multiple signals paths 210a-n, or some combination thereof.

The gain control module 206 can dynamically determine an amount by which the gain of signals traversing the signal paths 202a-n should be adjusted. In some aspects, one or more gain adjustments can be selected, identified, or otherwise determined such that the signals traversing the signal paths 202a-n are transmitted by a remote unit 120 at a desired power level. For example, the gain control module 206 can determine that a lower amount of power is present in one or more of the signal paths 210a-n. The gain control module 206 can determine from the lower amount of power that one or more services provided by the DAS 100 do not require full power during a given time period. The gain control module 206 can increase the power for signals traversing one or more of the signal paths 202a-n, which may correspond to other services provided via the DAS 100, based on determining that some services provided by the DAS 100 do not require full power.

In additional or alternative aspects, the gain adjustment can be selected, identified, or otherwise determined such that another suitable target metric for the DAS 100 is achieved. One example of a suitable target metric is a prioritization of services. The power optimization sub-system 104 can identify an upper gain limit for each service provided by the DAS 100. The power optimization sub-system 104 can also identify priorities for respective services provided by the DAS 100. The gain limits and priorities can be stored in a non-transitory computer-readable medium included in or accessible by the power optimization sub-system 104. A gain assignment algorithm executed by the power optimization sub-system 104 can assign an available amount of power to a service having the highest priority. For example, an available amount of power for a service provided by a remote unit can be a difference between a specified maximum output power for the remote unit and a sum of the power measurements of signals being provided to the remote unit. The power measurements can be obtained using the power measurements modules 204a-n, 212a-n. In some aspects, a gain limit for this service can limit the amount of available power that may be assigned to the service. For example, a maximum amount of available power (e.g., a difference between a specified output power for the remote unit and a sum of the power measurements of signals being provided to the remote unit) may be less than a gain limit for a given service. The gain limit can be identified by the power optimization sub-system 104 from the data stored in a non-transitory computer-readable medium. The gain control module 206 can increase the power allocated to the service up to the gain limit, subject to the amount of power available.

For cases in which a service having the highest priority cannot fully use the available power budget due to a gain limit for the service, the power optimization sub-system 104 can increase the gain for the highest priority service up to its gain limit and assign the remaining power to lower priority services. In some aspects, the remaining power can be assigned to lower priority services in an iterative manner. For example, the power optimization sub-system 104 can increase the gain for the highest priority service up to a gain limit for the highest priority service, assign a portion of the remaining power to the next highest priority service up to a gain limit for the next highest priority service, assign another portion of the remaining power to the next highest priority service up to its gain limit, and so on until the available power has been assigned. In additional or alternative aspects, the power optimization sub-system 104 can allocate an available amount of power to multiple services in a manner that is proportionate or otherwise corresponds to the priorities of the services. In such aspects, the power for the highest priority service may not be maximized. In additional or alternative aspects, combinations of these or other approaches may be used to allocate available power among services having different priorities.

Another example of a suitable target metric is a reduction of intermodulation products. For example, the gain control module 206 or another suitable module in the power optimization sub-system 104 can perform a spectral analysis of signals received from one or more base stations 101a, 101b. The gain control module 206 or other suitable module can determine an estimated spectrum of intermodulation products that may be generated by communication of the received signals having given signal powers via the DAS 100. The gain control module 206 or other suitable module can iteratively adjust the gains of one or more of the signals to achieve an intermodulation distortion target. For example, the gain control module 206 or other suitable module can select one or more gain adjustment values, generate an updated estimate of the spectrum of intermodulation products, and determine whether the updated estimate of the spectrum of intermodulation products satisfies the intermodulation distortion target. If so, the gain control module 206 can use the selected gain adjustment values. If not, the gain control module 206 can continue selecting one or more additional gain adjustment values and determining an estimated spectrum of intermodulation products until an intermodulation distortion target is obtained.

Another example of a suitable target metric is a balancing of amounts of power budgeted for communication links of the DAS 100. For example, the gain control module 206 or another suitable module in the power optimization sub-system 104 can determine an degree to which each service provided by the DAS 100 may benefit from an improved downlink link budget. The gain control module 206 can adjust the gains of signals traversing one or more signals paths 202a-n based on the determined degree to which each service provided by the DAS 100 may benefit from an improved downlink link budget. An example of an indicator for the degree to which each service may benefit from an improved downlink link budget is a number of remote units communicatively coupled to a given base station via the unit 102. If a first service uses one remote unit for one base station, the first service may have an uplink budget that is 3 dB greater than a second service that uses two remotes unit for one base station.

The gain control module 206 can be used to configure the variable gain adjustment modules 208a-n to adjust the gain of the signals traversing the signal paths 202a-n. In some aspects, the gain control module 206 can output data identifying the gain adjustment to a processing device included in or communicatively coupled to the variable gain adjustment modules 208a-n. The processing device can configure one or more of the variable gain adjustment modules 208a-n to adjust respective gains in response to receiving the data. In other aspects, the gain control module 206 can output a voltage or current indicative of the gain adjustment to the variable gain adjustment modules 208a-n via electrical connections between the gain control module 206 and the variable gain adjustment modules 208a-n. The voltage or current can configure one or more of the variable gain adjustment modules 208a-n to adjust the gain by the amount determined at the gain control module 206.

Although FIG. 2 depicts multiple variable gain adjustment modules 208a-n, other implementations are possible. In some aspects, variable gain adjustment modules can be implemented as a hardware device that can receive inputs from multiple signal paths or an engine executed by a processor that can receive inputs associated with multiple signal paths. For example, a variable gain adjustment module can receive inputs from or inputs associated with multiple signals paths 202a-n. This variable gain adjustment module can apply a variable gain to signals received as inputs from or inputs associated with multiple signals paths 202a-n.

A combiner 216 in the unit 102 can be communicatively coupled to the signal paths 202a-n, 210a-n. The combiner 216 can combine the gain-adjusted signals traversing one or more signal paths 202a-n with the signals traversing one or more signal paths 210a-n. The combined signals can be provided to a remote unit 120 via the distribution and aggregation network 114. The static gain module 112 can include a power amplifier 214 in the remote unit 120. The power amplifier 214 can apply the same gain to the signals received from the unit 102. The total gain applied to the signals that traverse signal paths 202a-n can include the gain applied by the respective variable gain adjustment modules 208a-n and the gain applied by the power amplifier 214. The total gain applied to the signals that traverse signal paths 210a-n can include the gain applied by the power amplifier 214 without any variable gain applied by the power optimization sub-system 104.

Figure 3:
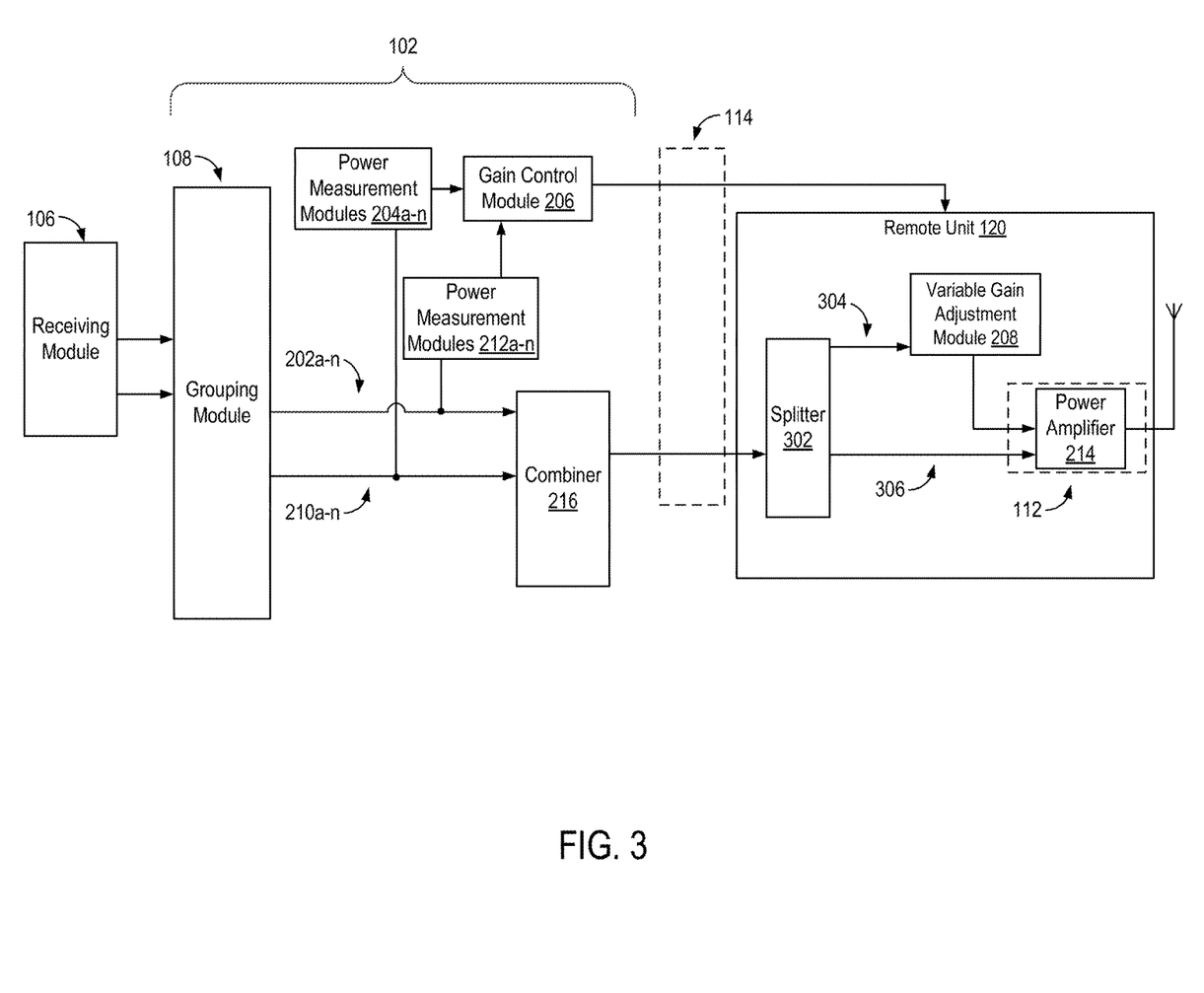
FIG. 3 is a block diagram depicting an alternative example of the power optimization sub-system of FIG. 1 according to one aspect of the present disclosure.

In additional or alternative aspects, the variable gain module 110 can be implemented using features in both the unit 102 and one or more of the remote units 120a-d. For example, FIG. 3 is a block diagram depicting an alternative example of the power optimization sub-system 104 according to one aspect. As depicted in FIG. 3, the unit 102 includes the power measurement modules 204a-n, 210a-n and the gain control module 206, and the remote unit 120 includes a variable gain adjustment module 208.

The gain control module 206 depicted in FIG. 3 can output data identifying a gain adjustment. The unit 102 can transmit the data identifying the gain adjustment to the remote unit 120. In some aspects, as depicted in FIG. 3, the unit 102 can transmit the data identifying the gain adjustment via a dedicated communication link separate from the communication link used to transmit signals received from the base station to the remote unit 120. In additional or alternative aspects, as depicted in FIG. 3, the unit 102 can transmit the data identifying the gain adjustment via the same communication link used to transmit signals received from the base station to the remote unit 120.

As depicted in FIG. 3, the remote unit 120 can include a splitter 302. The splitter 302 or other suitable device can split or otherwise separate combined signals received from the unit 102 into a first signal path 304 and a second signal path 306. A first set of signals selected by the grouping module 108 and provided to the first signal path 304 can be signals to which a variable gain is to be applied using the variable gain module 110. The variable gain adjustment module 208 can apply a dynamically determined gain to the signals traversing signal path 304. A second set of signals selected by the grouping module 108 and provided to the second signal path 306 can be signals to which a static gain is to be applied without using the variable gain module 110. The power amplifier 214 can apply a static gain to the signals traversing signal path 306. For illustrative purposes, a single signal path 304 and a single signal path 306 are depicted in FIG. 3. However, any number of parallel signal paths 304 and any number of parallel signal paths 306 can be included in the remote unit 120.

In some aspects, the gain adjusted signals outputted by the variable gain adjustment module 208 can be provided to the power amplifier 214, as depicted in FIG. 3. In other aspects, the gain adjusted signals outputted by the variable gain adjustment module 208 can be transmitted without further gain adjustment by the power amplifier 214.

In some aspects, the gain control module 206 can determine a gain adjustment that is common to all of the remote units of the DAS 100. In additional or alternative aspects, it can determine different gain adjustments for different subsets of remote units of the DAS 100, where a given gain adjustment for a given subset of remote units is applied for each of the remote units in the subset. In additional or alternative aspects, the gain control module 206 can determine different gain adjustments for different remote units. For example, the gain control module 206 can determine a first gain adjustment for a first one of the remote units 120a-d and a second gain adjustment for a second one of the remote units 120a-d. For the implementation depicted in FIG. 2, the gain control module 206 can configure a first variable gain adjustment module to apply the first gain adjustment to signals being provided to the first one of the remote units 120a-d, and the gain control module 206 can configure a second variable gain adjustment module to apply a second gain adjustment to signals being provided to the second one of the remote units 120a-d. For the implementation depicted in FIG. 3, the gain control module 206 can configure the unit 102 to transmit first data to the first one of the remote units 120a-d, where the first data identifies the first gain adjustment, and the gain control module 206 can configure the unit 102 to transmit second data to the second one of the remote units 120a-d, where the second data identifies the second gain adjustment.

Figure 4:
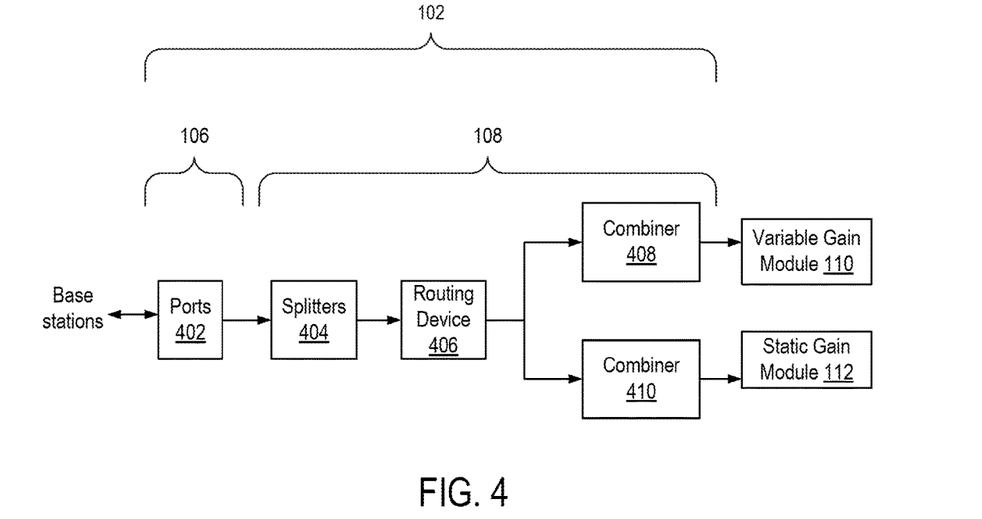
FIG. 4 is a block diagram depicting an example of an analog implementation of a receiving module and a grouping module for the power optimization sub-system of FIG. 1 according to one aspect of the present disclosure.

The receiving module 106 and the grouping module 108 can be implemented in any suitable manner. For example, FIG. 4 is a block diagram depicting an example of an analog implementation of the grouping module 108 for the power optimization sub-system 104 according to one aspect. As depicted in FIG. 4, the receiving module 106 can include ports 402 of the unit 102. The ports 402 can be communicatively coupled to respective antenna ports of one or more of the base stations 101a, 101b.

In some aspects, a Crest factor reduction algorithm may be used to put the noise energy of a correction signal into a received signal with the highest gain. The grouping module 108 can include one or more devices for separating and routing signals received via the ports 402. For example, the grouping module 108 depicted in FIG. 4 includes splitters 404, a routing device 406, and combiners 408, 410. The variable gain module 110 and the static gain module 112 can include one or more of the implementations depicted in FIGS. 3 and 4.

One or more splitters 404 or other suitable devices can be communicatively coupled to the ports 402. The splitters 404 or other suitable devices can split or otherwise separate downlink signals or other signals received via the ports 402.

The split signals can be provided to a routing device 406. An example of a routing device 406 is a switch matrix. In some aspects, the routing device 406 can be configured by a processing device or other devices that are used to identify which signals are to have a variable gain applied and which signals are to have a static gain applied. In additional or alternative aspects, an operator of the DAS 100 can configure the routing device 406 to route some signals to the variable gain module 110 and to route other signals to the static gain module 112.

The routing device 406 can provide a first subset of the received signals to a combiner 408. The combiner 408 can combine the first subset of the received signals and provide the combined signals to the variable gain module 110. The routing device 406 can provide a second subset of the received signals to a combiner 410. The combiner 410 can combine the second subset of the received signals and provide the combined signals to the static gain module 112. In some aspects, one or more of the combiners 408, 410 can be omitted.

Figure 5:
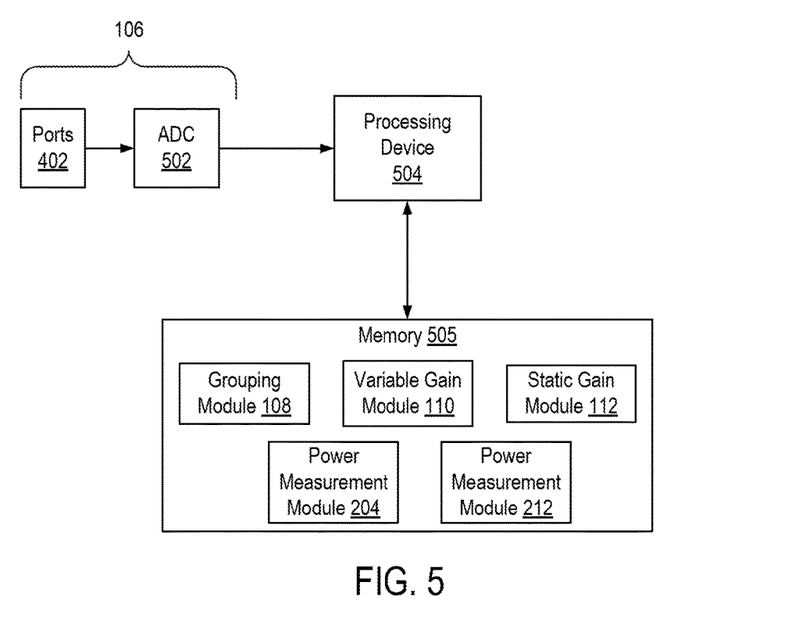
FIG. 5 is a block diagram depicting an example of a digital implementation for the power optimization sub-system of FIG. 1 according to one aspect of the present disclosure.

FIG. 5 is a block diagram depicting an example of a digital implementation for the power optimization sub-system 104 according to one aspect. As depicted in FIG. 5, the receiving module 106 can include an analog-to-digital converter 502. The analog-to-digital converter 502 can convert signals received via the ports 402 into digital signals. The unit 102 can provide the digitized signals to a processing device 504. Examples of a processing device 504 include a microprocessor, an application-specific integrated circuit ("ASIC"), a field-programmable gate array ("FPGA"), or other suitable processing devices. The processing device 504 may include any number of processors, including one. The processing device 504 can be communicatively coupled to a memory 506. The memory 506 can be any non-transitory computer-readable medium capable of tangibly embodying executable instructions and can include electronic, magnetic, or optical devices. Examples of a non-transitory computer-readable medium include random access memory ("RAM"), read-only memory ("ROM"), magnetic disk, an ASIC, a configured processor, or other storage device. Program instructions stored in the memory 506 can include one or more of the grouping module 108, the variable gain module 110, the static gain module 112, and the power measurement modules 204a-n, 212a-n.

The processing device 504 can identify which signals are to have a variable gain applied and which signals are to have a static gain applied. In some aspects, the processing device 504 can execute the grouping module 108 to group digital signals. In additional or alternative aspects, the processing device 504 can execute the grouping module 108 to configure a routing device 406 to route analog signals. For example, the processing device 504 can determine a base station from which a signal was received or a remote unit to which the signal is to be provided. The processing device 504 can access data from the memory 506 that identifies a mapping between base stations and the application of either a variable gain or a static gain. Additionally or alternatively, the processing device 504 can access data from the memory 506 that identifies a mapping between remote units and the application of either a variable gain or a static gain.

Any suitable criteria can be used by one or more of a processing device 504 and an operator of the DAS 100 to route different sets of signals to the variable gain module 110 or the static gain module 112. In some aspects, the routing device 406 or other grouping module 108 can route signals received from a first base station or set of base stations to the variable gain module 110 and to route signals received from a second base station or set of base stations to the static gain module 112.

In additional or alternative aspects, the routing device 406 or other grouping module 108 can route signals that are to be provided to a first remote unit or set of remote units to the variable gain module 110 and to route signals that are to be provided to a second remote unit or set of remote units to the static gain module 112. For example, signals that are to be provided to a remote unit at or near the center of a coverage zone may be routed to a variable gain module 110, and signals that are to be provided to a remote unit at or near the edge of a coverage zone may be routed to a static gain module 112. The processing device 604 may identify a remote unit as being near a boundary of the coverage zone based on the distance between the remote unit and the boundary being greater than the distance between the remote unit and the center of the coverage zone. The processing device 604 may identify a remote unit as being near a center of the coverage zone based on the distance between the remote unit and the center being greater than the distance between the remote unit and a boundary of the coverage zone.

Figure 6:
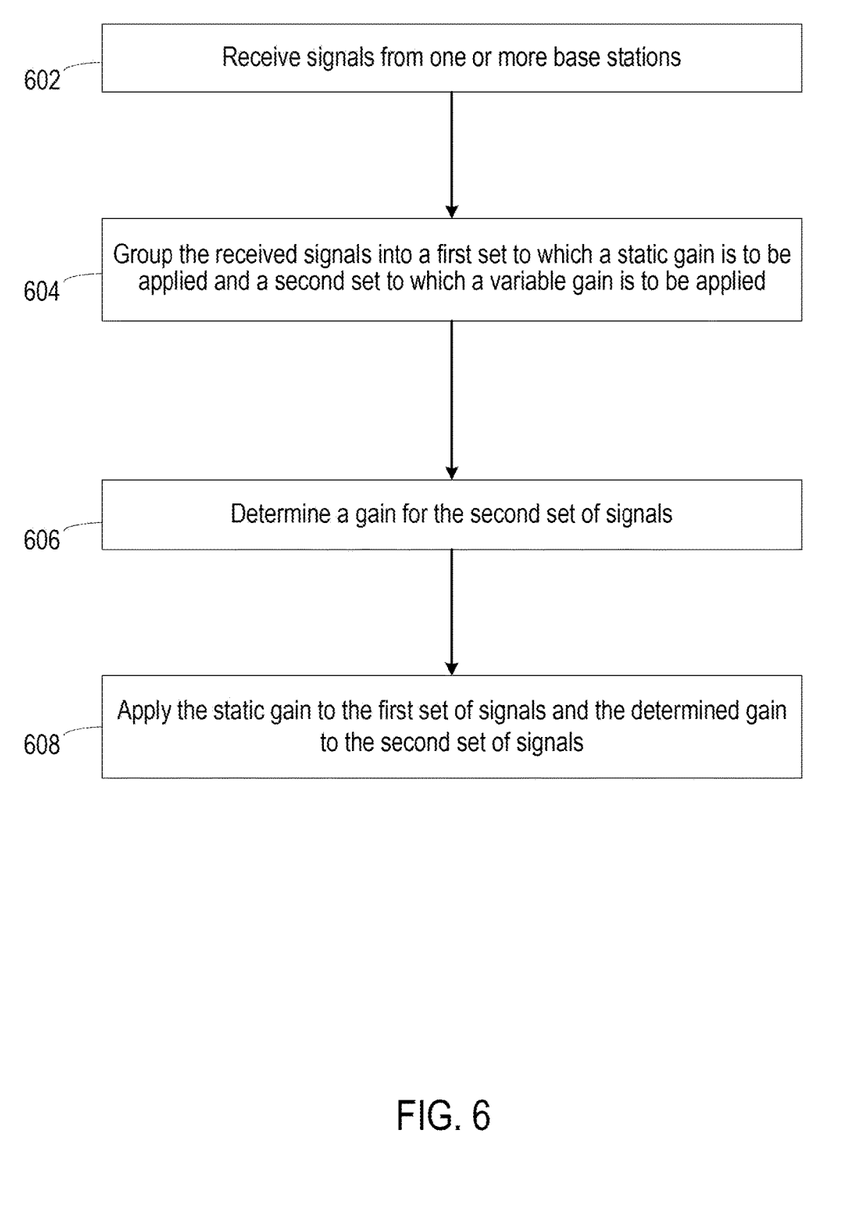
FIG. 6 is a flow chart depicting an example of a method for optimizing power allocation in a DAS according to one aspect of the present disclosure.

FIG. 6 is a flow chart depicting an example of a method 600 for optimizing power allocation in a DAS or other RF distribution system using the power optimization sub-system 104 according to one aspect. The method 600 is described with respect to one or more of the aspects and examples described above with respect to FIGS. 1-5. Other implementations, however, are possible.

The method 600 involves receiving signals from one or more base stations, as depicted in block 602. For example, a unit 102 of the DAS 100 can receive signals from a base station via the ports 402 or other suitable receiving module 106.

The method 600 also involves grouping the received signals into a first set of signals to which a static gain is to be applied and a second set of signals to which a variable gain is to be applied, as depicted in block 604. For example, a grouping module 108 can identify signals to which a variable gain is to be applied using the variable gain module 110. The grouping module 108 can identify signals to which a static gain is to be applied without using the variable gain module 110. The grouping module 108 can group the received signals into sets of signals in any suitable manner, as described above with respect to FIGS. 4 and 5.

The method 600 also involves determining a gain for the second set of signals to which the variable gain is to be applied, as depicted in block 606. For example, a variable gain module 110 can select, determine, or otherwise identify an amount of gain adjustment to be applied to the second set of signals. The variable gain module 110 can do so in any suitable manner, as described above with respect to FIGS. 2 and 3.

The method 600 also involves applying the static gain to the first set of signals and the determined gain to the second set, as depicted in block 608. For example, a power amplifier 214 or other static gain module can apply the static gain to the first set of signals, and one or more variable gain adjustment modules 208a-n can apply the gain determined by a gain control module 206 to the second set of signals, as described above with respect to FIGS. 2 and 3.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
   receiving, by a unit of a distributed antenna system, downlink signals from one or more base stations;
   determining, for each downlink signal, whether applying a variable gain or a static gain to the downlink signal would provide more effective coverage in the distributed antenna system;
   grouping, by the unit, the downlink signals into a first set of downlink signals to apply a static gain and a second set of downlink signals to apply a variable gain, based on the results of the determinations as to whether applying a variable gain or a static gain would provide more effective coverage;
   applying the static gain to the first set of downlink signals;
   determining a gain for at least some signals from the second set of downlink signals that is sufficient to achieve a specified metric indicative of a performance level of the distributed antenna system; and
   applying the determined gain to the at least some signals from the second set of downlink signals.

2. The method of claim 1, wherein applying the static gain includes applying the static gain by at least one of the unit or a remote unit of the distributed antenna system that transmits the second set of downlink signals or applying the determined gain includes applying the determined gain by at least one of the unit or a remote unit of the distributed antenna system that transmits the second set of downlink signals.

3. The method of claim 1, wherein determining the gain comprises:
   determining that a first subset of signals from the second set of downlink signals is to be provided to a first remote unit of the distributed antenna system and that a second subset of signals from the second set of downlink signals is to be provided to a second remote unit of the distributed antenna system; and
   determining a first gain for the first subset of signals and a second gain for the second subset of signals, wherein the first gain is different from the second gain, wherein the first gain is applied to the first subset of signals and the second gain is applied to the second subset of signals.

4. The method of claim 1, wherein the determined gain is applied to each signal in the second set of downlink signals.

5. The method of claim 1, wherein determining the gain for the at least some signals comprises:
   measuring signal powers for at least some of the downlink signals received from the one or more base stations; and
   determining the gain based on the measured signal powers.

6. The method of claim 1, further comprising:
   routing the first set of downlink signals to a first signal path between the unit and a remote unit of the distributed antenna system, wherein routing the first set of downlink signals to the first signal path causes the static gain to be applied to the first set of downlink signals; and routing the second set of downlink signals to a second signal path between the unit and the remote unit, wherein routing the second set of downlink signals to the second signal path causes the variable gain to be applied to the second set of downlink signals by a variable gain adjustment device.

7. The method of claim 1, further comprising selecting, by the unit, the first set of downlink signals to which the static gain is to be applied based on the first set of downlink signals being received from a first base station and selects the second set of downlink signals to which the variable gain is to be applied based on the second set of downlink signals being received from a second base station.

8. The method of claim 1, further comprising:
selecting, by the unit, the first set of downlink signals to which the static gain is to be applied based on determining that the first set of downlink signals is to be provided to a first remote unit being positioned closer to a center of a coverage zone than a boundary of the coverage zone; and
selecting, by the unit, the second set of downlink signals to which the variable gain is to be applied based on determining that the second set of downlink signals is to be provided to a second remote unit being positioned closer to the boundary of the coverage zone than the center of the coverage zone.

9. A power optimization sub-system comprising:
a receiving module of a unit of a distributed antenna system, the receiving module configured to receive downlink signals from one or more base stations and determine, for each downlink signal, whether applying a variable gain or a static gain to the downlink signal would provide more effective coverage in the distributed antenna system;
a grouping module communicatively coupled to the receiving module, the grouping module configured to group the downlink signals into a first set of downlink signals to apply a static gain and a second set of downlink signals to apply a variable gain, based on the results of the determinations as to whether applying a variable gain or a static gain would provide more effective coverage; and
a variable gain module configured to (i) determine a gain for at least some signals from the second set of downlink signals that is sufficient to achieve a specified metric indicative of a performance level of the distributed antenna system, (ii) provide the first set of downlink signals to a first signal path that is unaffected by the variable gain module, and (iii) provide the second set of downlink signals to a second signal path that is communicatively coupled to the variable gain module.

10. The power optimization sub-system of claim 9, further comprising a static gain module configured to apply the static gain to the first set of downlink signals.

11. The power optimization sub-system of claim 10, wherein the variable gain module is further configured to apply the determined gain to the at least some signals from the second set of downlink signals.

12. The power optimization sub-system of claim 11, wherein the variable gain module comprises a variable gain adjustment device in the unit of the distributed antenna system.

13. The power optimization sub-system of claim 11, wherein the variable gain module comprises a variable gain adjustment device in a remote unit of the distributed antenna system that is remote from and communicatively coupled to the unit of the distributed antenna system.

14. The power optimization sub-system of claim 9, wherein the variable gain module is configured to determine the gain by performing operations comprising:
determining that a first subset of signals from the second set of downlink signals is to be provided to a first remote unit of the distributed antenna system and that a second subset of signals from the second set of downlink signals is to be provided to a second remote unit of the distributed antenna system; and
determining a first gain for the first subset of signals and a second gain for the second subset of signals, wherein the first gain is different from the second gain.

15. The power optimization sub-system of claim 9, wherein the variable gain module is configured to determine the gain by performing operations comprising:
measuring signal powers for at least some of the downlink signals received from the one or more base stations; and
determining the gain based on the measured signal powers.

16. The power optimization sub-system of claim 9, wherein the grouping module is configured to:
select the first set of downlink signals to which the static gain is to be applied based on the first set of downlink signals being received from a first base station; and
select the second set of downlink signals to which the variable gain is to be applied based on the second set of downlink signals being received from a second base station.

17. The power optimization sub-system of claim 9, wherein the grouping module is configured to:
select the first set of downlink signals to which the static gain is to be applied based on determining that the first set of downlink signals is to be provided to a first remote unit being positioned closer to a center of a coverage zone than a boundary of the coverage zone; and
select the second set of downlink signals to which the variable gain is to be applied based on determining that the second set of downlink signals is to be provided to a second remote unit being positioned closer to the boundary of the coverage zone than the center of the coverage zone.

18. A distributed antenna system comprising:
a unit communicatively coupled to a remote unit, the unit configured to:
receive downlink signals from one or more base stations,
determine, for each downlink signal, whether applying a variable gain or a static gain to the downlink signal would provide more effective coverage in the distributed antenna system,
group the downlink signals into a first set of downlink signals to apply a static gain and a second set of downlink signals to apply a variable gain, based on the results of the determinations as to whether applying a variable gain or a static gain would provide more effective coverage,
determine a gain for at least some signals from the second set of downlink signals that is sufficient to achieve a specified metric indicative of a performance level of the distributed antenna system, and
transmit data identifying the determined gain to the remote unit; and the remote antenna unit configured to:
　apply the static gain to the first set of downlink signals, and
　apply the determined gain to the at least some signals from the second set of downlink signals.

19. The distributed antenna system of claim 18, wherein the unit comprises:
　a gain control module configured to determine the variable gain;
　a first signal path that is not communicatively coupled to the gain control module;
　a second signal path that is communicatively coupled to the gain control module; and
　a routing device configured to route the first set of downlink signals to the first signal path and route the second set of downlink signals to the second signal path.

20. The distributed antenna system of claim 18, wherein the unit is configured to:
　select, by the unit, the first set of downlink signals to which the static gain is to be applied based on determining that the first set of downlink signals is to be provided to a first remote unit being positioned closer to a center of a coverage zone than a boundary of the coverage zone; and
　select, by the unit, the second set of downlink signals to which the variable gain is to be applied based on determining that the second set of downlink signals is to be provided to a second remote unit being positioned closer to the boundary of the coverage zone than the center of the coverage zone.

\* \* \* \* \*